United States Patent [19]

Scordato et al.

[11] 4,367,198

[45] Jan. 4, 1983

[54] REAGENT RESERVOIR SYSTEM FOR USE IN TESTING APPARATUS

[75] Inventors: Richard E. Scordato, Scarsdale; Robert J. Varca, Fort Lee; Robert S. Francis, Mount Vernon, all of N.Y.

[73] Assignee: Medical Laboratory Automation, Inc., Mount Vernon, N.Y.

[21] Appl. No.: 275,420

[22] Filed: Jun. 19, 1981

[51] Int. Cl.[3] .......................... B01L 3/00; B01L 7/00; G01N 35/00

[52] U.S. Cl. .................................... 422/102; 222/372; 422/65; 422/66; 422/81; 220/20.5

[58] Field of Search ..................... 422/102, 65, 66, 81, 422/82; 222/209, 211, 214, 372, 146; 73/864.91; 215/1 A; 229/75; 220/20.5, 90.2, 90.4; 366/184, 191, 290

[56] References Cited

U.S. PATENT DOCUMENTS

| | | | |
|---|---|---|---|
| 2,823,487 | 2/1958 | Mandlak | 222/211 |
| 3,558,033 | 1/1971 | Leeds | 215/1 A |
| 3,827,304 | 8/1974 | D'Autry | 422/100 |
| 4,151,256 | 4/1979 | Pedersen | 422/102 |
| 4,200,607 | 4/1980 | Suzuki | 422/64 |

*Primary Examiner*—Michael S. Marcus
*Attorney, Agent, or Firm*—William P. Keegan

[57] ABSTRACT

A reagent delivery system having a reagent reservoir adapted to permit mechanical stirring of the reagent therein and removal of the reagent from the bottom of the reservoir, and a compact heat exchange unit through which the reagent flows to facilitate rapid heating of the reagent immediately prior to its use in a testing apparatus.

3 Claims, 8 Drawing Figures

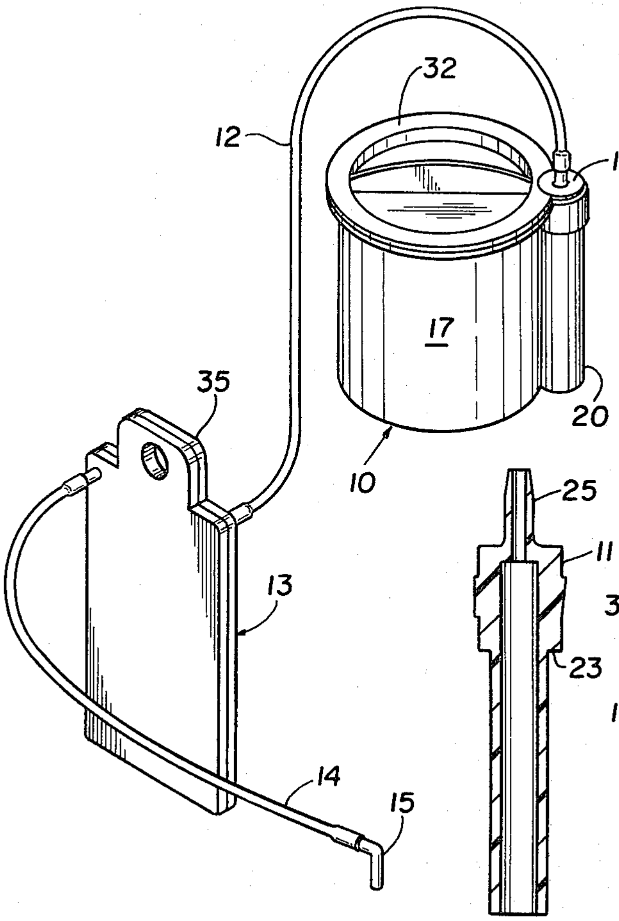
FIG.1
FIG.4
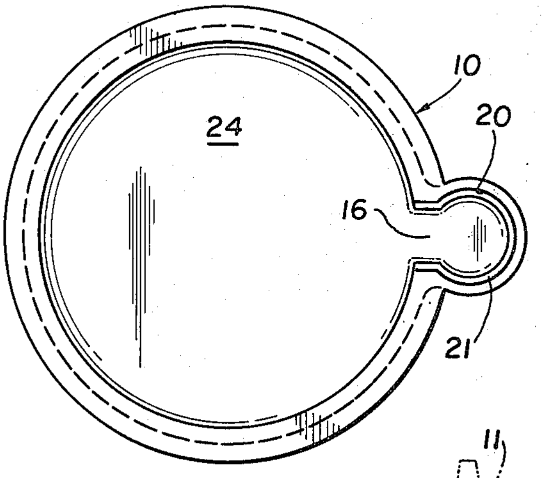
FIG.3
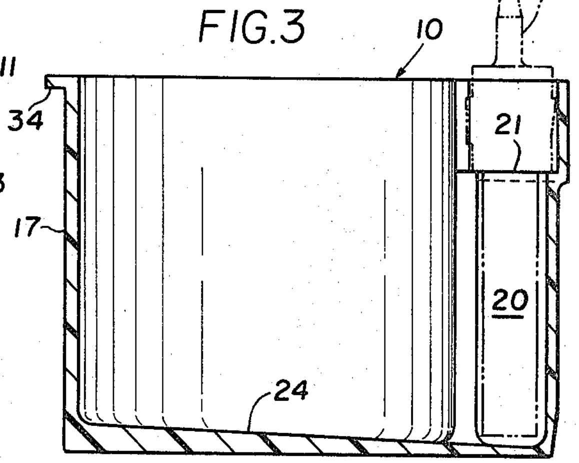
FIG.2
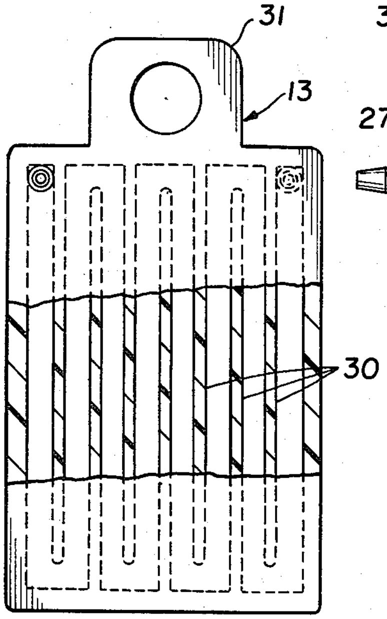
FIG.5
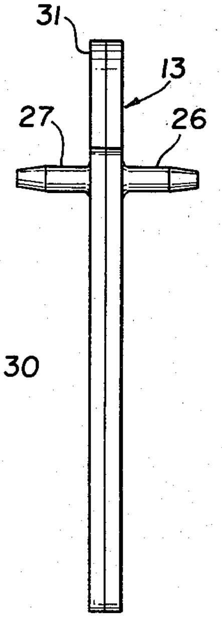
FIG.6
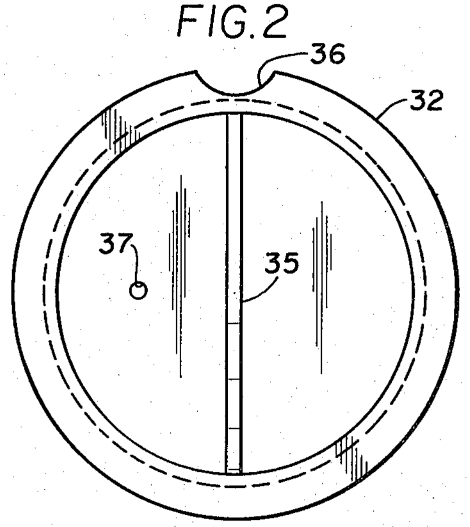
FIG.7
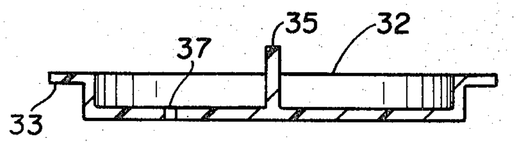
FIG.8

REAGENT RESERVOIR SYSTEM FOR USE IN TESTING APPARATUS

BACKGROUND OF THE INVENTION

In many testing apparatuses, such as a coagulation instrument in which the prothrombin time or the activated partial thromboplastin time of a plasma sample is determined, it is preferred to store the reagent that is to be mixed with the plasma at a temperature of 8° C. and then to raise the temperature of the reagent to 37° C. immediately prior to its being mixed with the plasma. U.S. Pat. No. 3,969,079 discloses such an instrument in which the reagent is cooled and then heated.

BRIEF SUMMARY OF THE INVENTION

The present invention relates to a reagent delivery system, and more particularly to a system which facilitates the storage of reagent at a reduced temperature and the subsequent warming of the reagent to the desired temperature for testing.

It is an object of the present invention to provide an improved reagent delivery system for a testing apparatus.

It is another object of the invention to provide a delivery system which facilitates the storage of reagents for long periods of time without deterioration and the ready availability of the reagent without manual intervention.

In carrying out the invention, there is provided a cylindrical reagent storage reservoir having an adjacent housing member in fluid communication therewith. The housing member accommodates a fluid delivery member that withdraws reagent from the bottom of the storage reservoir and delivers it to a compact maze-like heat exchange unit that is insertable in an incubation unit to warm the reagent to the desired temperature. A further reagent line and nozzle may be provided for delivering the warmed reagent to the vessel holding the plasma to be tested. The cylindrical storage reservoir facilitates the use of a reagent stirring device such as a magnetic stirrer employing a stirring member that operates within the reservoir.

Features and advantages of the invention may be gained from the foregoing and from the description of a preferred embodiment of the invention which follows.

BRIEF DESCRIPTION OF THE DRAWING

FIG. 1 is a schematic illustration of the reagent delivery system of the present invention:

FIG. 2 is a top plan view of the reagent storage reservoir;

FIG. 3 is a sectional view taken along line 3—3 of FIG. 2;

FIG. 4 is a sectional view of the dip tube insertable into the storage reservoir;

FIG. 5 is a front elevational view of the heat exchanger unit;

FIG. 6 is a side elevational view of the heat exchanger unit;

FIG. 7 is a top plan view of the storage reservoir cover; and

FIG. 8 is a sectional view taken along line 8—8 of FIG. 7.

DETAILED DESCRIPTION OF THE INVENTION

Reference is made to FIG. 1 of the drawing wherein reagent storage reservoir 10 is shown to have a dip tube 11 placed therein. Plastic tubing 12 is frictionally fitted over the dip tube, and it connects the tube to heat exchange unit 13, the remote end of tubing 12 being fitted onto an inlet fitting of the heat exchange unit. From an outlet fitting of unit 13, a second section of plastic tubing 14 extends to a nozzle 15 which is fitted into tubing 14.

The storage reservoir 10, shown more particularly in FIGS. 2 and 3, comprises a cylindrical cup having a vertical slot extending from the top to the bottom of sidewall 17. This slot 16 serves to connect the interior of reservoir 10 to the interior of the dip tube housing 20. The dip tube housing is provided with an interior ledge 21 that serves to limit the distance that dip tube 11 can be inserted into the housing. Note that tube 11 is formed with a shoulder 23 that engages ledge 21 and spaces the bottom of the dip tube slightly above the bottom wall of housing 20.

It will be observed that the bottom wall 24 of reservoir 10 is sloped towards housing 20 so that the last traces of reagent in reservoir 10 will drain towards the bottom inlet opening of dip tube 11. The provision of a separate housing for the dip tube 11 instead of placing the dip tube directly into reservoir 10 facilitates stirring of the contents of reservoir 10. Thus, for example, a plastic coated bar magnet could be placed in reservoir 10 and rotated by a rotating magnetic field produced by a device located below the reservoir.

Dip tube 11 is shown in more detail in FIG. 4 wherein it is seen to be a generally hollow tube having an enlarged top portion that forms shoulder 23 for the purpose mentioned above. A nipple 25 is provided at the upper end of the tube so that plastic tubing 12 may conveniently be attached to the dip tube.

The heat exchange unit 13 to which tubing 12 leads is shown in FIGS. 5 and 6. Heat exchange unit 13 is formed with an inlet nipple 26, to which tubing 12 is connected, and an outlet nipple 27. The interior of heat exchange unit 13 is formed with partitions 30 that alternately extend from the top and the bottom walls of the heat exchanger and terminate just short of the walls towards which they extend. This structure provides a series of contiguous fluid paths leading from inlet nipple 26 to outlet nipple 27, and is such that a fluid, i.e., the reagent, will flow down one path and up the next. The compact arrangement of the fluid paths in heat exchanger 13 means that a relatively small incubation unit may be used to warm the reagent quickly from 8° C. to 37° C. A handle 31 is provided for inserting heat exchanger 13 into, and removing it from, an incubation well provided in the testing apparatus.

FIGS. 7 and 8 show a cover 32 for reservoir 10. Cover 32 is formed with a flange 33 that engages the rim 34 of reservoir 10 in a sealing relationship. A grippable member 35 facilitates placement of cover 32 on reservoir 10. A crescent shaped cutout 36 surrounds dip tube 11 when all of the system parts are assembled as shown in FIG. 1. An aperture 37 is provided in cover 32 so that the pump that withdraws reagent from reservoir 10 does not have to work against a low back pressure that would otherwise result if reservoir 10 were air-tight.

In a preferred application of the disclosed reagent delivery system, reservoir 10 would be placed in a well that is thermoelectrically cooled to keep the reagent at 8° C., and heat exchanger 13 would be placed in a well that is electrically warmed to bring the reagent temperature to 37° C. A peristaltic pump would be provided to work on tubing 14.

Having thus described the invention, it is to be understood that other embodiments of the invention, differing from the preferred embodiment described, could be provided without departing from the spirit and scope of the invention. For example, the heat exchanger could be formed with interconnected concentric paths. Therefore, it is intended that the foregoing specification and drawing be interpreted as illustrative rather than in a limiting sense.

What is claimed is:

1. A reagent delivery system for use in a testing apparatus in which the reagent is stored at a relatively low temperature and then a portion thereof raised to a higher temperature prior to being mixed with another liquid, said system comprising: a reagent storage reservoir including a reagent cup adapted to accommodate a rotating magnetic stirrer bar, said cup having a substantially cylindrical sidewall and a bottom wall, said sidewall having a vertical slot extending from the top edge thereof to said bottom wall, and a tubular housing having a bottom wall contiguous with the bottom wall of said reagent cup integrally formed on the outside of said cup so that said slot is common to said cup and said housing, said housing also being formed with a supporting ledge; a dip tube formed at its upper end with an outlet nipple and with an external shoulder for supporting said dip tube on the supporting ledge of said tubular housing, said dip tube when thus supported extending from above the top edge of said reagent cup downwardly to a position adjacent the bottom wall of said housing; a heat exchange unit having a plurality of parallel fluid conduit segments joined at their ends to form a flat enclosed maze-like elongated fluid passageway, said heat exchange unit having an inlet member at one end of said passageway and an outlet member at the opposite end of said passageway; a nozzle means; and flexible tubing means connecting the outlet nipple of said dip tube to the inlet member of said heat exchange unit and the outlet member of said heat exchange unit to said nozzle means.

2. A reagent delivery system according to claim 1 wherein the external surfaces of the bottom walls of said reagent cup and said tubular housing form a flat coplanar surface and the internal surfaces thereof are a contiguous plane inclined downwardly towards said tubular housing.

3. A reagent delivery system according to claim 1 including a circular closure means for covering the open top of said reagent cup, said closure means having a crescent-like cutout along its periphery that engages said dip tube, and a venting port to prevent a reduction in back pressure as reagent is pumped from said reagent cup.

* * * * *